United States Patent
Ho et al.

(10) Patent No.: US 7,098,890 B2
(45) Date of Patent: Aug. 29, 2006

(54) INPUT EQUIPMENT WITH SENSED MOVEMENT FEEDBACK

(75) Inventors: Tai Shui Ho, Taipei Hsien (TW); Shih Kuang Tsai, Taipei Hsien (TW); Yong Kang Liu, Shanghai (CN); Yan Jin, Shanghai (CN); Xin Ke Shi, Shanghai (CN)

(73) Assignee: Inventec Appliances Corp., Taipei Hsein (TW)

( * ) Notice: Subject to any disclaimer, the term of this patent is extended or adjusted under 35 U.S.C. 154(b) by 507 days.

(21) Appl. No.: 10/671,442

(22) Filed: Sep. 29, 2003

(65) Prior Publication Data

US 2005/0068298 A1 Mar. 31, 2005

(51) Int. Cl.
*G09G 5/08* (2006.01)
(52) U.S. Cl. .................. 345/157; 345/167; 345/173
(58) Field of Classification Search ........ 345/156–158, 345/161, 163, 166–168, 173
See application file for complete search history.

(56) References Cited

U.S. PATENT DOCUMENTS 5,149,986 A * 9/1992 Jalbert .................. 307/117
6,359,611 B1 * 3/2002 Chan .................... 345/156
6,480,185 B1 * 11/2002 Kiljander et al. .......... 345/167
2002/0154090 A1 * 10/2002 Lin ...................... 345/156

\* cited by examiner

*Primary Examiner*—Richard Hjerpe
*Assistant Examiner*—Kimnhung Nguyen
(74) *Attorney, Agent, or Firm*—Bacon & Thomas

(57) ABSTRACT

The present invention discloses an input equipment with a sensed movement feedback, which comprises a pressure sensor pad having a through hole at the center, a rolling ball disposed in the through hole with part of the rolling ball exposed and protruded therefrom, and at least one driver contacting with the surface of the rolling ball. The sensor pad will produce a signal according to a pressing force exerting thereon and transmit the signal to a control circuit of the input equipment, enabling the control circuit to produce a rolling signal for activating the driver to move the rolling ball in a direction proportion to the pressing force. Thus, the user can sense the direction and speed of the cursor movement on the screen from sensing the rolling movement of the rolling ball.

4 Claims, 2 Drawing Sheets

INPUT EQUIPMENT WITH SENSED MOVEMENT FEEDBACK

BACKGROUND OF THE INVENTION

1. Field of the Invention

The present invention relates to an input equipment with sensed movement feedback.

2. Description of the Related Art

This is the world with blooming information; all kinds of high-tech products are derived from computers. The development of high technology is extremely fast, not only reducing the distance between people, but also shortening the time and distance between spaces, which is indispensable to our life. As various information products are introduced to the market, particularly the popular application of notebook computers, people have high demands on the quality of portable computers. Whether or not a notebook computer can provide a more convenient and effective service has become an important index to evaluate the manufacturing technology of the information product of a country whether such country is leading others.

The portable computer of early stage is not light but weighs about 7~14 kg, and the laptop computers weighs about 4~7 Kg. However, the current notebook computer only weighs about 1~4 Kg; besides the light, thin, short, and compact design in weight and volume, the development also tends to be all-in-one. In view of the current information market, the competition is severe. Since there are numerous brands of notebook computers in the information market, therefore it gives a big pressure for computer companies to create good sales performance, and also offers more choices for consumers. Offering a reasonable price for a humanistic, multifunctional, all-in-one notebook computer becomes one of the important factors for a computer to stand out in the severe competition of the information market.

A notebook computer, as its name suggests, is similar to a notebook which can be opened and closed, and thus having excellent portability. It comprises a display panel and a main system, and at least one hinge to connect the display panel and the main system, such that the screen of the display panel can be closed at regular time. When a user wants to use the notebook computer, the user only need to rotate the display panel by using the hinge as the axis for an axial rotation until the display panel reaches an appropriate position and angle, and then using the keyboard on the main system to enter information into the main system. The main system uses a communication line to send the information to the display panel, and displays the content of the related information on the screen of the display panel. Due to the fast development of application programs, particularly the popular application of various windows operating systems (such as Microsoft Windows), only a keyboard being used for entering the commands into such operating system will cause lots of inconvenience to the operation. For example, it is inconvenient and troublesome to control the direction of the movement of a pointer or open an icon displayed on the screen by using a keyboard only. Therefore, in addition to a keyboard, notebook computers usually come with at least a pointing device to simplify the operating procedure of such operating system, and improve the controllability of such pointer.

Besides keyboards, the input device currently adopted by most people is a mouse, which is also a kind of pointing devices. As its name suggests, a pointing device refers to the input device for controlling a pointer. In general, it is very convenient to use a pointing device to operate a window interface operating system (such as Microsoft Windows) or other computer application programs. As the time is changed, various pointing devices having the same function of a mouse are developed, and widely used on notebook computers, and gradually become one of the standard equipments of the notebook computer. For example, a pointing stick (also called track point), which is made of rubber material and substantially in a cylindrical shape, is generally protruded from an appropriate position between the keys of the keyboard. Its controlling method is by mechanical touch; the direction of the pointer can be controlled by moving a finger on the pointing stick, and the notebook computer can sense and control the moving direction of the pointer. A touch pad, which is also commonly used on notebook computers to control the pointer, just requires a very simple procedure for the operation. The user just needs to touch the touch pad with a finger and gently press on the touch pad to control the moving direction of the pointer.

Besides the external mouse, the main system of the current notebook computers usually comes with a built-in touch pad, and such touch pad can move the direction of the pointer on the screen according to the pressing direction of the user's finger. The moving speed of the pointer depends on the pressing force of the finger. However, when a user uses such touch pad to enter data, the user can only visually determine the movement of the pointer on the screen, and cannot sense the movement of the cursor by the operation of such touch pad. Therefore, the cursor cannot be moved to the desired position, which is very inconvenient.

SUMMARY OF THE INVENTION

The primary objective of the present invention is to provide an input equipment with a sensed movement feedback, which comprises a pressure sensor pad having a through hole at the center, a rolling pad disposed in the through hole with part of the rolling ball being exposed and protruded from the through hole, and at least one driver in contact with the surface of the rolling ball. When a user presses the sensor pad to control a cursor on a screen of an electronic device electrically connected to the input equipment, the sensor pad will produce a signal according to the pressure and direction of the pressing force and transmit the signal to a control circuit of the input equipment. The control circuit will then produce a rolling signal depending on the signal and transmit the rolling signal to the driver, activating the driver to move the rolling ball in a direction and a distance proportion to the pressing force. Thus, the user can sense the direction and speed of the cursor movement on the screen through sensing the rolling movement of the rolling ball by finger, and quickly and accurately manipulate the cursor to the desired position.

Another objective of the present invention is to provide an input equipment with a sensed movement feedback which comprises a switch under the rolling ball, the switch is defined as an executing key (such as the left button of a mouse), so that the user can click an option on the screen. By pressing the center of the rolling ball with a force, the rolling ball presses on an electric conductor of the switch to produce a short connection signal being sent to the electronic device to process the selected option. By means of exerting a pressure on the center of the rolling ball, we can attain the purpose of clicking the option on the screen.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
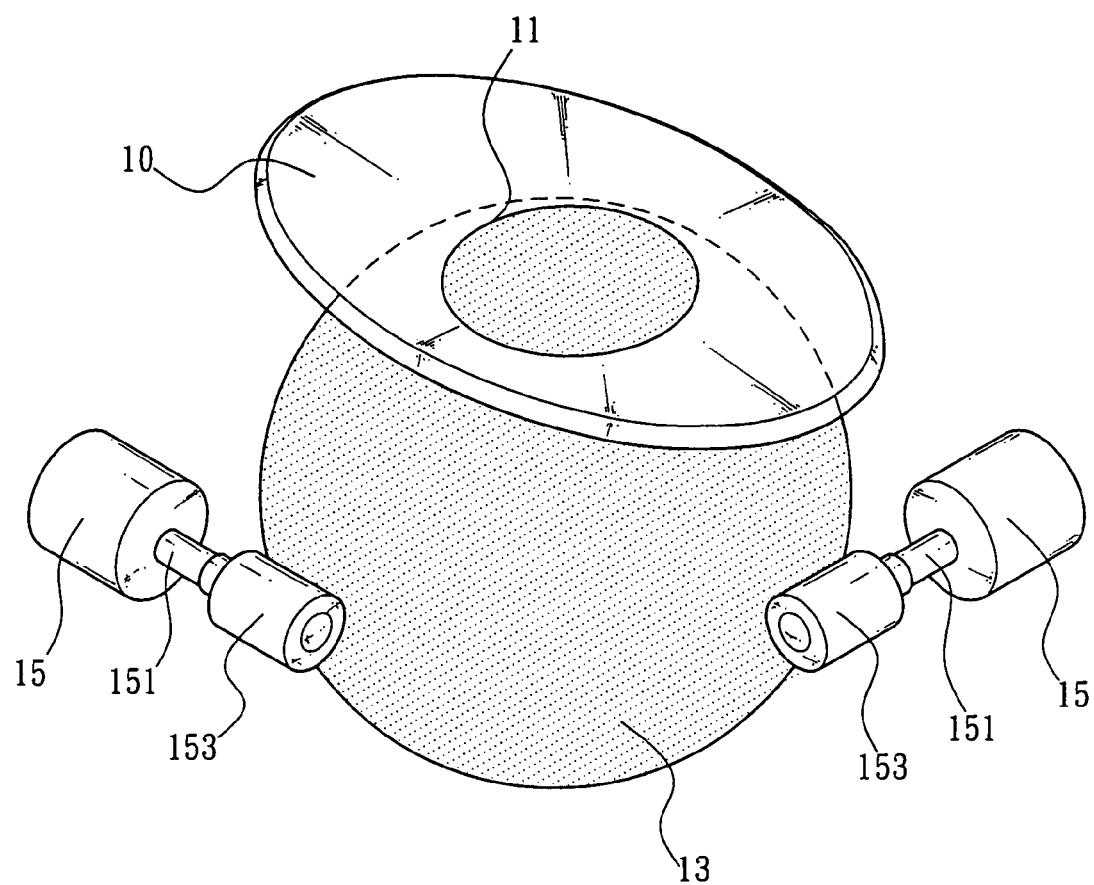
FIG. 1 is a perspective diagram of the input equipment with sensed movement feedback according to the present invention.

Please refer to FIG. 1 for the input equipment with a sensed movement feedback according to the present invention, which comprises a pressure sensor pad 10, a though hole disposed at the center of the sensor pad 10, a rolling ball 13 disposed in the through hole with some part of the rolling ball 13 being exposed and protruded from the through hole 11 of the sensor pad 10, and at least one driver 15 contacting the surface of the rolling ball 13, so that when a user exerts a pressing force onto the sensor pad 10 to control a cursor on a screen of an electronic device (not shown) electrically connected to the input equipment, the sensor pad 10 will produce a signal according to the pressure and direction of the pressing force and transmit the signal to a control circuit (not shown) of the input equipment. The control circuit will then produce a rolling signal depending on the signal and transmit the rolling signal to the driver 15, activating the driver 15 to move the rolling ball 13 in a direction and a distance proportion to the pressing force. Thus, the user can sense the direction and speed of the cursor movement on the screen from sensing the rolling movement of the rolling ball 13 by finger, and quickly and accurately manipulate the cursor to a desired position.

Figure 2:
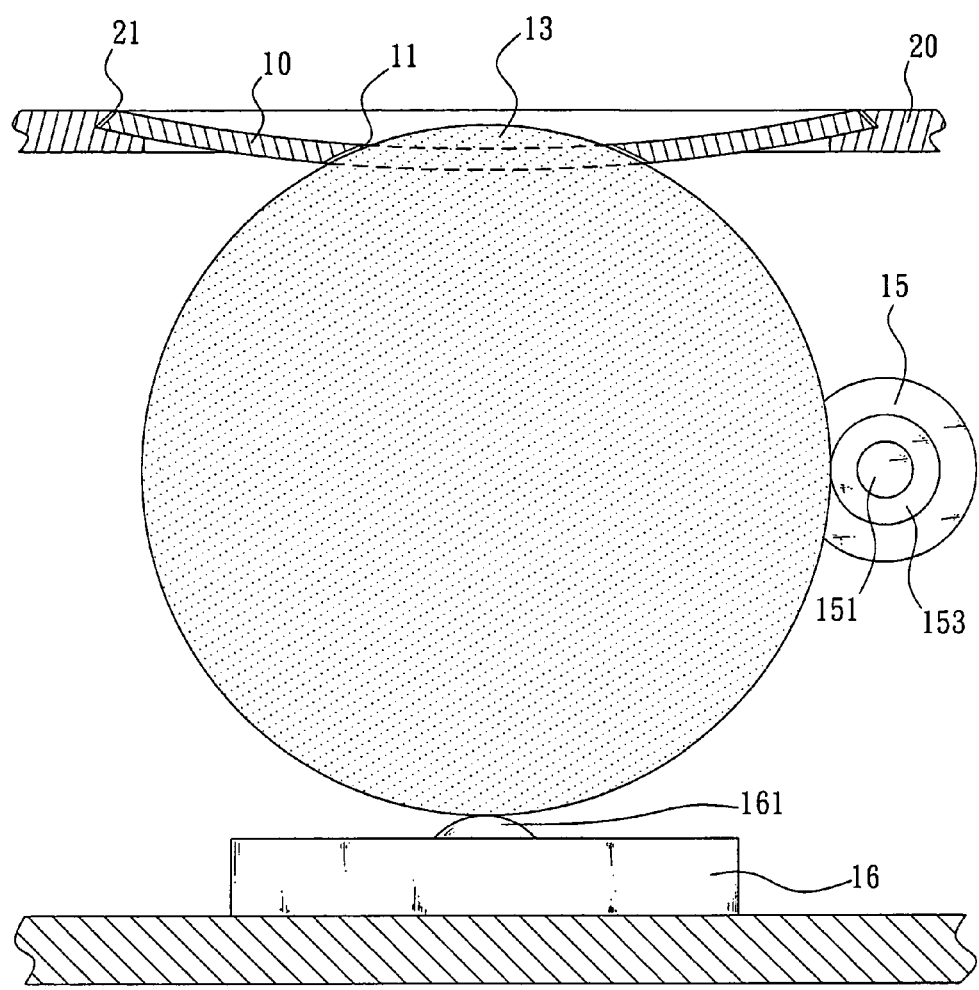
FIG. 2 is an illustrative diagram of the input equipment with sensed movement feedback according to the present invention.

Please refer to FIGS. 1 and 2 for a preferred embodiment of the present invention. In these figures, the input equipment comprises a housing 20 having a through hole 21 disposed at the top of the housing 20, a sensor pad 10 disposed on the through hole 21 of the housing 20, a through hole 11 passing through the center of the sensor pad 10, a rolling ball 13 disposed on the through hole 11, and at least one driver disposed on a side of the rolling ball 13 and in contact with the surface of the rolling ball 13, wherein the rolling ball 13 is disposed under the sensor pad 10 in the housing 20 with some part of the rolling ball 13 being exposed and protruded from the through hole 11 of the sensor pad 10. When the user wants to control the cursor on the screen of the electronic device (not shown) electrically connected to the input equipment, the user may exert a pressing force onto the sensor pad 10 to produce a signal according to the pressure and direction of the pressing force. The sensor pad 10 then transmits the signal to the control circuit (not shown) of the input equipment for producing a rolling signal depending on the signal and transmitting the rolling signal to the driver 15, activating the driver 15 to move the rolling ball 13 in a direction and a distance proportion to the pressing force. In this embodiment, the area of sensor pad 10 is larger than a finger, so that the user can easily touch the sensor pad 10 and simultaneously sense the rolling movement of the rolling ball 13 for quickly and accurately manipulating the cursor movement on the screen to a desired position.

Again referring to FIG. 2 for the preferred embodiment of the present invention, the input equipment further comprises a switch 16 disposed under the rolling ball 13. The switch 16 is defined as an executing key (such as the left button of a mouse) and is electrically (directly or indirectly) connected to the electronic device. In this embodiment, an elastic electric conductor 161 is disposed on the switch 16, so that when the user moves the cursor to the position of an option on the screen and intends to click the option, the user may press the center of the rolling ball 13 by a force enabling the elastic electric conductor 161 of the switch 16 to be pressed by the rolling ball 13 to produce a short connection signal being sent to the electronic device for processing the selected option. By means of pressing the center of the rolling ball 13, the option on the screen is then selected or activated.

Please refer to FIGS. 1 and 2 again. The driver 15 could be a motor, and the motor is located on the side of the rolling ball 13 and has a circular driving roller 153 disposed on the rotary axis 151 of the motor in contact with the surface of the rolling ball 13 tangentially. In another embodiment of the present invention, as shown in FIG. 2, the input equipment comprises two motors disposed at the positions having an angle of 90 degrees therebetween enabling the circular driving roller 153 disposed on the rotary axis 151 of each motor to be in contact with the surface of the rolling ball 13 tangentially. So that when the motor (or motors) is rotating to drive the rolling ball 13, the user can sense the direction and speed of the moving cursor on the screen through sensing the rolling movement of the rolling ball 13.

While the invention has been described by means of specific embodiments, numerous modifications and variations could be made thereto by those skilled in the art without departing from the scope and spirit of the invention set forth in the claims.

What is claimed is:

1. An input equipment with sensed movement feedback, comprising:

a housing;

a pressure sensor pad, being disposed on a through hole at the top of said housing, and having a through hole at the center thereof;

a rolling ball, being disposed under said sensor pad in said housing, with some part of said rolling ball exposed and protruded from said through hole of said sensor pad;

at least one driver, being disposed on one side of said rolling ball and in contact with the surface of said rolling ball; and a control circuit, being disposed in said housing and electrically connected to said pressure sensor pad and driver respectively;

such that when said sensor pad being pressed by a pressing force, the sensor pad will produce a signal according to the pressure and direction of the pressing force and transmit the signal to the control circuit, the control circuit will then produce a rolling signal depending on the signal and transmit the rolling signal to the driver, activating the driver to move the rolling ball.

2. The input equipment with sensed movement feedback of claim 1, wherein said sensor pad has an area larger than a finger.

3. The input equipment with sensed movement feedback of claim 1, said input equipment further comprises a switch disposed under said rolling ball and electrically connected to the electronic device, wherein an elastic electric conductor is disposed on the switch and will produce a short connection signal being sent to the electronic device while the elastic electric conductor being pressed by the rolling ball.

4. The input equipment with sensed movement feedback of claim 1, wherein said driver is a motor located on the side of the rolling ball and having a circular driving roller disposed on the rotary axis of the motor, enabling said circular driving roller to be in contact with the surface of the rolling ball tangentially.

* * * * *